United States Patent
Tsai et al.

(10) Patent No.: US 8,272,004 B2
(45) Date of Patent: Sep. 18, 2012

(54) OPTICAL DISC CLAMPING DEVICE

(75) Inventors: Yao-Ching Tsai, Taoyuan County (TW); Jen-Chen Wu, Taoyuan County (TW)

(73) Assignee: Quanta Storage Inc., Taoyuan County (TW)

(*) Notice: Subject to any disclaimer, the term of this patent is extended or adjusted under 35 U.S.C. 154(b) by 0 days.

(21) Appl. No.: 13/159,849

(22) Filed: Jun. 14, 2011

(65) Prior Publication Data

US 2012/0036521 A1 Feb. 9, 2012

(30) Foreign Application Priority Data

Aug. 4, 2010 (TW) .................. 99126036 A

(51) Int. Cl.
*G11B 17/028* (2006.01)
(52) U.S. Cl. .................. 720/713; 720/714
(58) Field of Classification Search .......... 720/706, 720/710, 712, 713, 714
See application file for complete search history.

(56) References Cited

U.S. PATENT DOCUMENTS

| | | | | |
|---|---|---|---|---|
| 5,590,113 A * | 12/1996 | Choi | ............ | 720/713 |
| 5,831,790 A * | 11/1998 | Iftikar et al. | ............ | 360/99.12 |
| 6,552,993 B2 * | 4/2003 | Huang | ............ | 720/712 |
| 6,845,511 B2 * | 1/2005 | Kuo et al. | ............ | 720/706 |
| 7,343,609 B2 * | 3/2008 | Lin | ............ | 720/706 |
| 7,533,395 B2 * | 5/2009 | Araki et al. | ............ | 720/712 |
| 7,543,315 B2 * | 6/2009 | Huang | ............ | 720/706 |
| 7,669,211 B2 * | 2/2010 | Chen | ............ | 720/714 |
| 8,001,558 B2 * | 8/2011 | Yamanaka | ............ | 720/713 |
| 8,069,453 B2 * | 11/2011 | Miyazaki | ............ | 720/612 |
| 2003/0123377 A1 * | 7/2003 | Eum et al. | ............ | 369/270 |
| 2006/0053432 A1 * | 3/2006 | Kuo | ............ | 720/706 |
| 2006/0195855 A1 * | 8/2006 | Sugiyama et al. | ............ | 720/704 |

* cited by examiner

*Primary Examiner* — Brian Miller
(74) *Attorney, Agent, or Firm* — Rabin & Berdo, P.C.

(57) ABSTRACT

An optical disc clamping device is provided. A driving bar is moved away from a center hole to synchronously drive a first linking bar and a second linking bar. A first pivotal rod and a second pivotal rod are respectively driven by the first slider and the second slider to move towards the center hole to drive a carrier which carries a chucking disk disposed thereon to contact a spindle motor. A suppresser is fixed at the rim of the center hole to press on the chucking disk to clamp the disc stably.

10 Claims, 6 Drawing Sheets

OPTICAL DISC CLAMPING DEVICE

This application claims the benefit of Taiwan application Serial No. 99126036, filed Aug. 4, 2010, the subject matter of which is incorporated herein by reference.

FIELD OF THE INVENTION

The invention relates in general to an optical disc drive, and more particularly to a clamping device which cooperates with a spindle motor to clamp or release an optical disc when an optical disc drive is loading or unloading the optical disc.

DESCRIPTION OF THE RELATED ART

The optical disc drive reads data from or writes data into an optical disc by rotating the optical disc at a high speed. However, high speed rotation may easily cause the optical disc to wobble and makes it difficult to read/write data, or even may cause the optical disc to come off and hurt the consumers. Thus, the optical disc drive must be able to tightly clamp the optical disc in rotation so that the data can be read or written smoothly.

FIG. 1 shows a top view of an optical disc clamping device according to the prior art (U.S. Pat. No. 6,577,580). According to the prior art of an optical disc drive 1, a center hole 3 is formed on the base plate 2, an optical disc clamping device 4 is disposed at the rim of the center hole 3, and a pair of driving bars 6a and 6b are extended from the ring base 5 of the optical disc clamping device 4. A transmission motor 7 enables the guide plates 8a and 8b to drive the driving bar 6a and 6b via a gear set (not illustrated in the diagram), so that the ring base 5 can rotate within limited angles at the rim of the center hole 3 as the slide recess 9 moves with respect to the fixing pin 10 disposed on the base plate 2. Ejector pins 11 protrude from the rim of the center hole 3 on the base plate 2 and are separated from each other by intervals of about 120 degrees. A gap 12 is indented into the inner circumferential surface of the ring base 5 at the vicinity of the ejector pin 11. A rotatable elastic piece 13 is fixed at a side of the gap 12 and is shaped as a curved sheet. One end of the elastic piece 13, which crosses over the ejector pin 11, is supported by the ejector pin 11 and penetrates the center hole 3 to be connected to the clamping round plate 14 so as to support the clamping round plate 14 in the center hole 3.

After the optical disc drive 1 loads an optical disc 16 with a roller 15, the transmission motor 7 drives the guide plates 8a and 8b to drive the driving bar 6a and 6b to rotate the ring base 5 clockwise and further drives one end of the elastic piece 13 to be off the support of the ejector pin 11 and sink. The clamping round plate 14 which sinks accordingly, attracts the spindle motor (not illustrated in the diagram) disposed underneath with a magnetic force, so as to clamp the optical disc 16 from both atop and underneath to facilitate the rotation of the optical disc 16. When the optical disc drive 1 is unloading the optical disc 16, the ring base 5 is rotated anti-clockwise to drive one end of the elastic piece 13 disposed on the ring base 5 to cross over and to be supported by the ejector pin 11 to rise. Meanwhile, the clamping round plate 14 is raised accordingly and set free from the magnetic attraction of the spindle motor, so that the optical disc 16 is released accordingly.

The optical disc clamping device 4 of the prior art raises the elastic piece 13 with the ejector pin 11, so that the clamping round plate 14 is raised and set free from the magnetic attraction of the spindle motor disposed underneath. However, the elastic piece 13, being too long and curved, cannot provide sufficient elasticity, and the ejector pin 11, being too short due to limited space, cannot provide sufficient uplifting force for enabling the clamping round plate 14 to be set free from the magnetic attraction of the spindle motor. Consequently, the optical disc 1 may not be completely released during the unloading process, and the optical disc drive and the optical disc may even be damaged. Besides, the optical disc in high speed rotation will wobble violently, and the clamping round plate and the magnetic attraction of the spindle motor may be unable to stably clamp the optical disc. Thus, an optical disc clamping device is further provided in the prior art. The optical disc clamping device of the prior art suppresses the clamping round plate with a suppresser. However, such a design further adds burden to the ejector pin in the process of raising the elastic piece, restricts the suppressing force of the suppresser and makes the releasing of the disc even more unstable. Thus, the structure of the generally known optical disc clamping device of the optical disc drive still has many problems to resolve.

SUMMARY OF THE INVENTION

According to an object of the invention, an optical disc clamping device is provided. A carrier is driven by the pivotal rods disposed at two ends of the clamping device to carry a clamping round plate upward or downwards so as to provide a reliable mechanism for clamping the optical disc.

According to another object of the invention, an optical disc clamping device is provided. A clamping round plate is pressed by an elasticity enhanced suppresser, so that the optical disc is more firmly clamped and the optical disc will not come off easily due to vibration.

To achieve the above objects, an optical disc clamping device of the invention is disposed on a base plate of the optical disc drive. The base plate has a center hole disposed above a spindle motor. A first slide recess and a second slide recess are respectively disposed at two opposite ends of the center hole. The base plate further has a slide channel in which a driving bar slides in a direction perpendicular to the two slide recesses. The first slider slides in the first slide recess, and the end of the first slider near the center hole is pivotally connected to a first pivotal rod. The second slider slides in the second slide recess, and the end of the second slider near the center hole is pivotally connected to a second pivotal rod. One end of the first linking bar is pivotally connected to one side of the driving bar, and the other end of the first linking bar is extended to the first slide recess and pivotally connected to the first slider. One end of the second linking bar is pivotally connected to the other side of the driving bar, and the other end of the second linking bar is extended to the second slide recess and pivotally connected to the second slider. A carrier is disposed in the center hole, and there is a round hole disposed in the middle of the carrier. The two ends of the carrier are pivotally connected to the first pivotal rod and the second pivotal rod respectively. A chucking disk is disposed in the round hole of the carrier.

When the driving bar is moved towards the center hole, the first linking bar and the second linking bar are synchronously driven for enabling the first slider and the second slider to respectively move the first pivotal rod and the second pivotal rod away from the center hole for driving the carrier to carry the chucking disk to be moved from the spindle motor so that the optical disc can be released. When the driving bar is moved away from the center hole, the first linking bar and the second linking bar are synchronously driven for enabling the first slider and the second slider to respectively drive the first pivotal rod and the second pivotal rod towards the center hole for driving a carrier to carry a chucking disk to contact the spindle motor. A suppresser is fixed at the rim of the center hole to press on the chucking disk to clamp the disc stably.

The above and other aspects of the invention will become better understood with regard to the following detailed description of the preferred but non-limiting embodiment(s). The following description is made with reference to the accompanying drawings.

DETAILED DESCRIPTION OF THE INVENTION

The technologies adopted in the invention for achieving the above objects are disclosed in a number of exemplary embodiments below with accompanying drawings.

Figure 1:
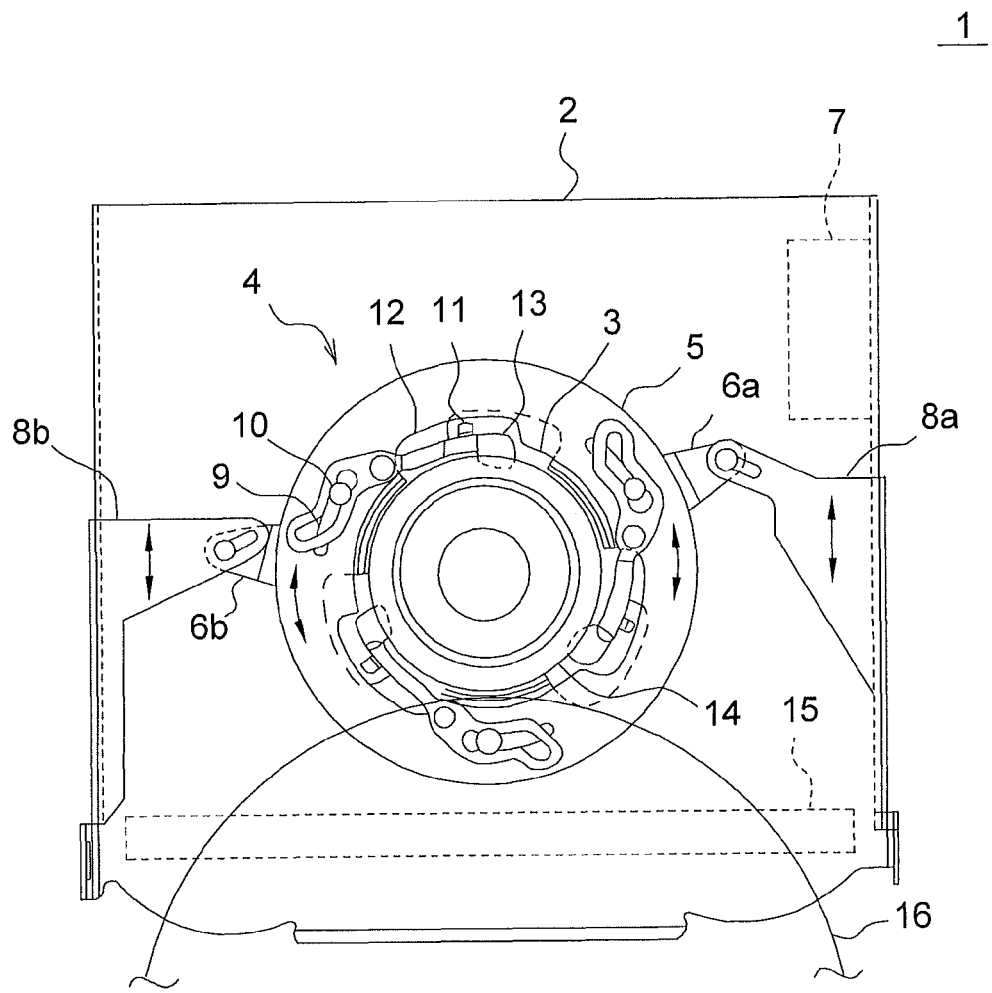
FIG. 1 shows a top view of an optical disc clamping device according to the prior art.
Figure 2:
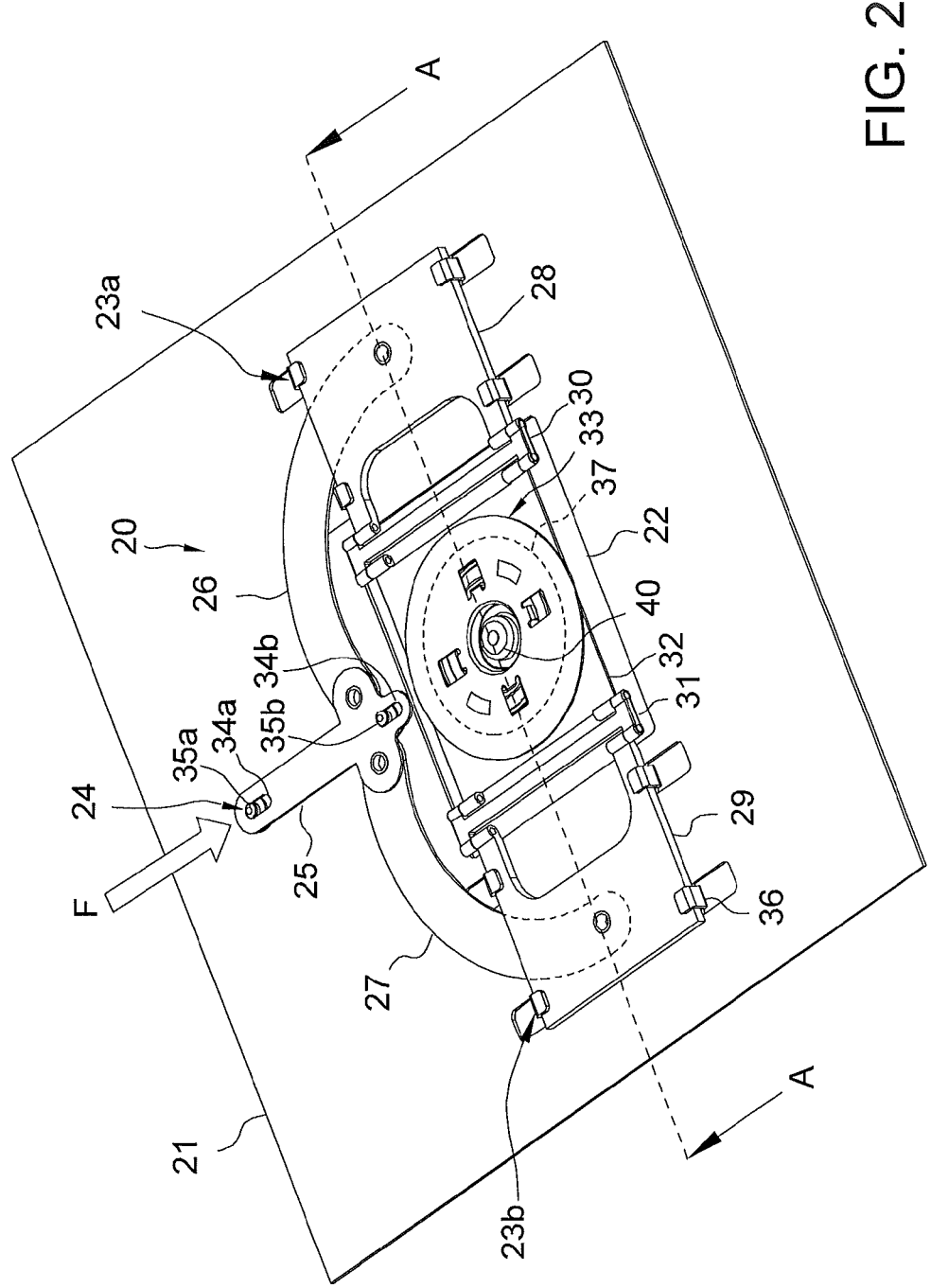
FIG. 2 shows a 3D diagram of an optical disc clamping device being in a release state according to a first embodiment of the invention.
Figure 3:
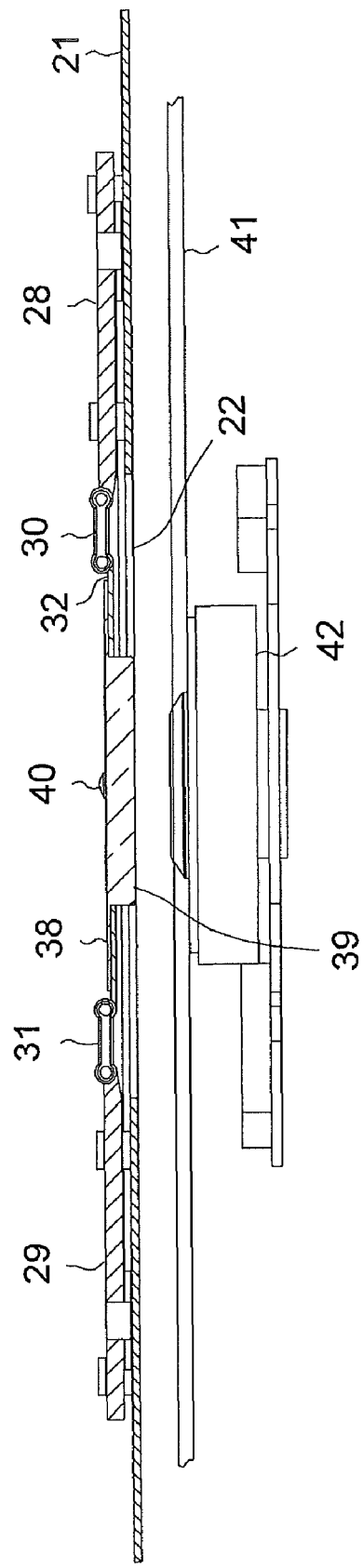
FIG. 3 shows a lateral cross-sectional view along the middle line A-A of FIG. 2.

Refer to both FIG. 2 and FIG. 3. FIG. 2 shows a 3D diagram of an optical disc clamping device 20 being in a release state according to a first embodiment of the invention. FIG. 3 shows a lateral cross-sectional view along the middle line A-A of FIG. 2. The optical disc clamping device 20 is disposed on the base plate 21 of an optical disc drive, wherein the base plate 21 can be realized by a casing or a cover of the optical disc drive. The center of the base plate 21 has a center hole 22, and each of two opposite ends of the center hole 22 has a first slide recess 23a and a second slide recess 23b opposite to the first slide recess 23a. One side of the base plate 21 near the center hole 22 has a slide channel 24 for guiding the sliding direction to be perpendicular to the two opposite slide recesses 23a and 23b.

The optical disc clamping device 20 includes a driving bar 25, a first linking bar 26, a second linking bar 27, a first slider 28, a second slider 29, a first pivotal rod 30, a second pivotal rod 31, a carrier 32, a chucking disk 33, and so on. Like the prior art, the driving bar 25 is driven by a transmission motor of the optical disc drive via a guide plate (not illustrated in the diagram) to slide in the slide channel 24. The slide guiding structure of the present embodiment is formed as follows. The holes 34a and 34b are respectively formed at the two ends of the driving bar 25, so that the slide channel 24 formed by a pair of guide pins 35a and 35b protruded from the base plate 21 penetrate the holes 34a and 34b to guide the driving bar 25 to slide towards or away from the center of the center hole 22. However, the slide guiding structure is not limited to the above exemplification, and other slide guiding structures can also be used in the invention.

The term "pivotally connected" refers to the connection which enables two components to rotate with respect to each other. One end of the first linking bar 26 is pivotally connected to one side of the driving bar 25, and the other end of the first linking bar 26 is extended to the first slide recess 23a and pivotally connected to the first slider 28 which slides in the first slide recess 23a. One end of the second linking bar 27 is pivotally connected to the other side of the driving bar 25 opposite to the first linking bar 26, and the other end of the second linking bar 27 is extended to the second slide recess 23b and pivotally connected to the second slider 29 which slide in the second slide recess 23b. Another slide guiding structure of the present embodiment is formed as follows. Two pairs of opposing U-shaped indentations are respectively formed to the lateral sides 36 of the first slide recess 23a and the second slide recess 23b of the base plate 21 by way of stamping, so that the two sliders are limited to slide towards or away from the center of the center hole 22. However, the slide structure is not limited to these exemplified in the present embodiment, and other slide guiding structures can also be used in the invention.

Both ends of each of the first pivotal rod 30 and the second pivotal rod 31 have a pivotal spindle. The end of the first slider 28 towards the center hole 22 is pivotally connected to the pivotal spindle disposed at one end of the first pivotal rod 30, and the end of the second slider 29 towards the center hole 22 is pivotally connected to the pivotal spindle disposed at one end of the second pivotal rod 31. The pivotal spindles disposed at the other ends of the first pivotal rod 30 and the second pivotal rod 31 are pivotally connected to the carrier 32 disposed at the two ends of the center hole 22 and support the carrier 32 from both ends so that the carrier 32 is exactly located at the center of the center hole 22, wherein the center hole 22 is larger than the carrier 32, and there is a round hole 37 at the center of the carrier 32.

The chucking disk 33 includes a ring piece 38 and a body 39. The aperture of the ring piece 38 is larger than the round hole 37 of the carrier 32. The body 39 is in the shape of a round plate with a magnet disposed therein. The aperture of the body 39 is slightly smaller than the round hole 37 of the carrier 32. The body 39 is disposed under the center of the ring piece 38. A dome 40 is protruded from the central hole of the ring piece 38. The body 39 is inserted into the round hole 37 of the carrier 32 and the chucking disk 33 is engaged with the carrier 32 at the rim of the round hole 37 by the ring piece 38 with larger aperture so as to be carried by the carrier 32.

When the optical disc clamping device 20 releases the optical disc 41, as indicated in the arrow F of FIG. 2, the driving bar 25 is driven to move towards the center hole 22 along the slide channel 24 and synchronously drives the first linking bar 26 and the second linking bar 27 to move towards the center hole 22 for enabling the other ends of the first linking bar 26 and the second linking bar 27 to synchronously drive the first slider 28 and the second slider 29 respectively to move away from the center hole 22 along the first slide recess 23a and the second slide recess 23b. Meanwhile, the first pivotal rod 30 and the second pivotal rod 31 are synchronously driven to move away from the center hole 22 respectively. Wherein, the first linking bar 26 and the second linking bar 27 are pivotally connected to two sides of the driving bar 25; the first slide recess 23a and the second slide recess 23b are disposed at two opposite ends of the center hole 22; the first pivotal rod 30 and the second pivotal rod 31 are pivotally connected to the end of the first slider 28 and the second slider 29 near the center hole 22. Then, the first pivotal rod 30 and the second pivotal rod 31 synchronously push the carrier 32 upwards from the two ends of the carrier 32 pivotally connected to the first pivotal rod 30 and the second pivotal rod 31 respectively. As indicated in FIG. 3, the carrier 32, the first slider 28, the second slider 29, the first pivotal rod 30, and the second pivotal rod 31 are approximately parallel to the base plate 21. Meanwhile, the carrier 32 carries the chucking disk 33 upwards, so that the chucking disk 33 is raised above the center hole 22 and set free from the magnetic attraction caused by the spindle motor 42 so as to release optical disc 41.

Figure 4:
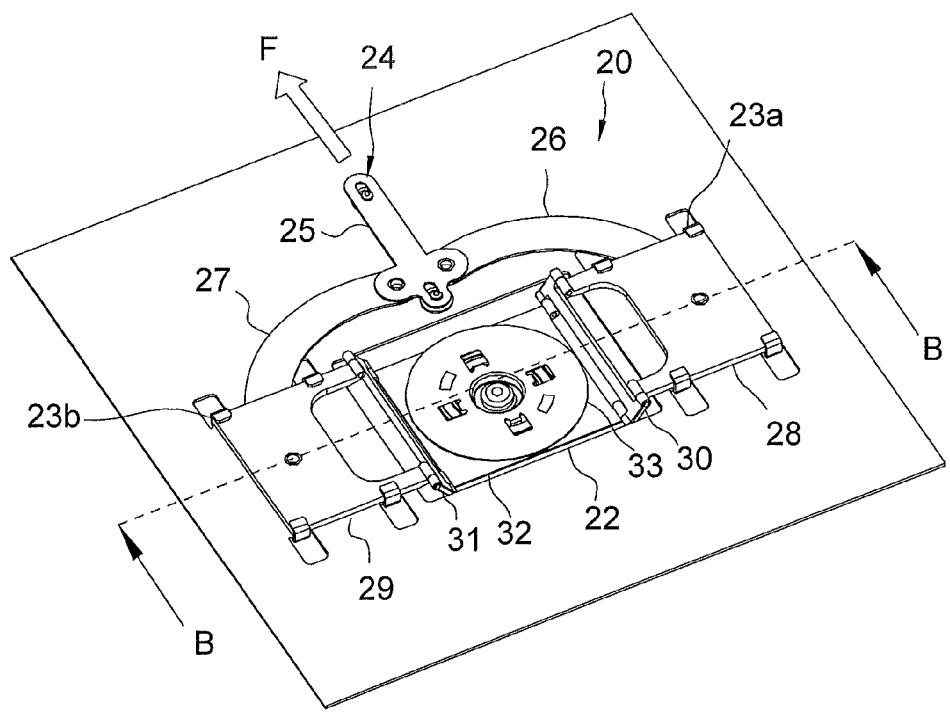
FIG. 4 shows a 3D diagram of an optical disc clamping device being in a clamp state according to a first embodiment of the invention.
Figure 5:
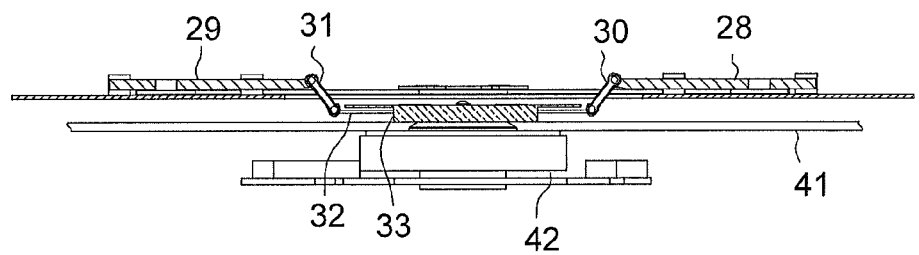
FIG. 5 shows a lateral cross-sectional view along the middle line B-B of FIG. 4.

Refer to both FIG. 4 and FIG. 5. FIG. 4 shows a 3D diagram of an optical disc clamping device 20 being in a clamp state according to a first embodiment of the invention. FIG. 5 shows a lateral cross-sectional view along the middle line B-B of FIG. 4. When the optical disc clamping device 20 clamps the optical disc 41, as indicated in the arrow F of FIG. 4, the driving bar 25 is driven to move away from the center hole 22 along the slide channel 24 and synchronously drives the first linking bar 26 and the second linking bar 27 to move away from the center hole 22, for enabling the other end of the first linking bar 26 and the second linking bar 27 to synchronously drive the first slider 28 and the second slider 29 to move towards the center hole 22 along the first slide recess 23a and the second slide recess 23b respectively. Meanwhile, the first pivotal rod 30 and the second pivotal rod 31 are synchronously driven to move towards the center hole 22. Wherein, the first linking bar 26 and the second linking bar 27 are pivotally connected to the two sides of the driving bar 25. As the carrier 32 is pushed from its two ends synchronously and pulled by its gravity and the magnetic force of the chucking disk 33 as indicated in FIG. 5, the carrier 32 is moved down towards the spindle motor 42 disposed underneath so that the chucking disk 33 clamps the optical disc 41 with the magnetic attraction caused by the spindle motor 42.

Thus, by loosening or tightening the pivotal rods disposed at the two ends of the carrier to control the required height for the carrier to rise or sink, the optical disc clamping device of the first embodiment can thus enable the chucking disk carried by the carrier to touch or come off the spindle motor, so that the clamping device can clamp or release the optical disc with desired reliability.

Figure 6:
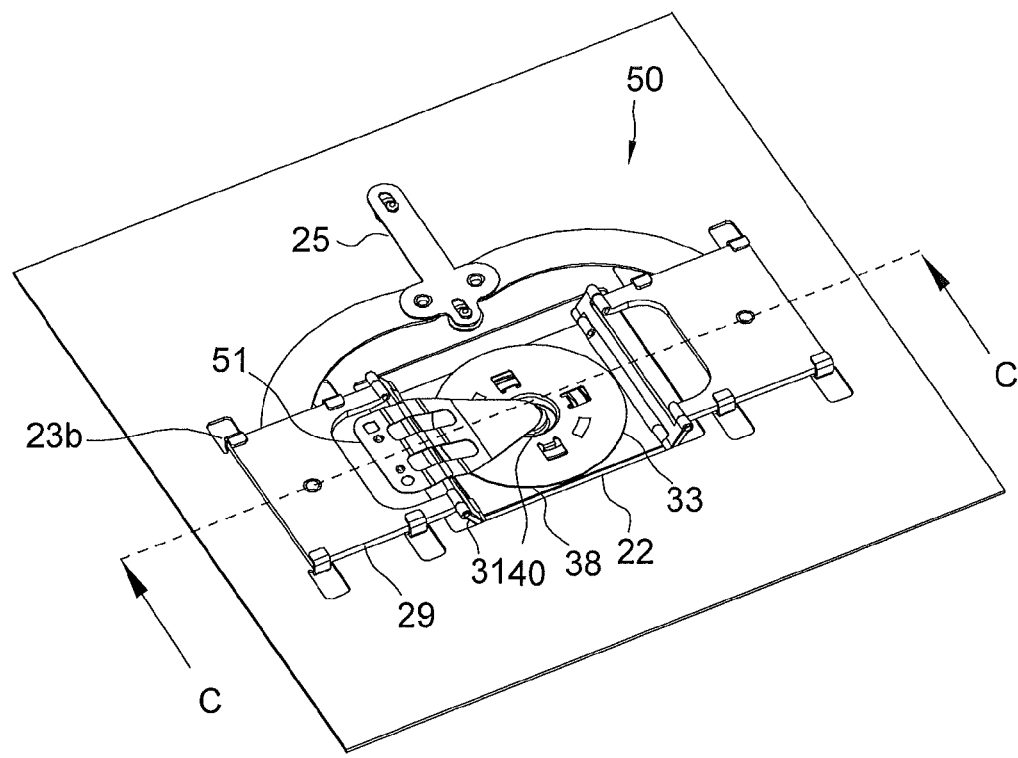
FIG. 6 shows a 3D diagram of an optical disc clamping device being in a clamp state according to a second embodiment of the invention.
Figure 7:
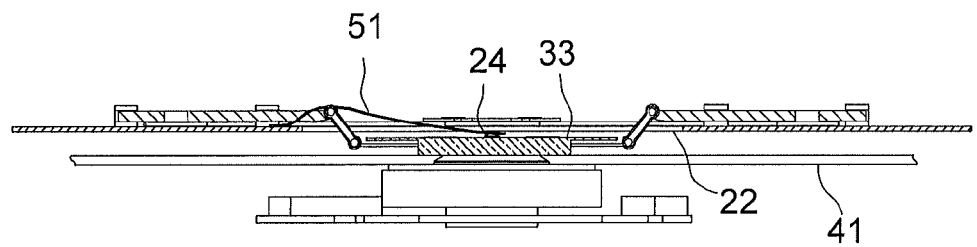
FIG. 7 shows a lateral cross-sectional view along the middle line C-C of FIG. 6.

As indicated in FIG. 6 and FIG. 7. FIG. 6 shows a 3D diagram of an optical disc clamping device 50 being in a clamp state according to a second embodiment of the invention. FIG. 7 shows a lateral cross-sectional view along the middle line C-C of FIG. 6. The fundamental structure of the optical disc clamping device of the present embodiment is the same with that of the first embodiment. To simplify the elaboration, the same designations are applied to the same components. The present embodiment is different from the first embodiment mainly in that the present embodiment additionally has a suppresser 51. The suppresser 51 can be disposed at any position at the rim of the center hole 22 as long as the operation of the first embodiment is not affected. For example, the suppresser 51 can be disposed at the rim of the center hole 22 opposite to the driving bar 25. In the present embodiment, the suppresser 51 is disposed on the rim of the second slide recess 23b near the center hole 22. Furthermore, the end of the second slider 29 near the center hole 22 is U-shaped to provide a space for fixing the suppresser 51. One end of the suppresser 51 is fixed at the rim of the center hole 22, and the other end crosses over the second pivotal rod 31 and presses on the dome 40 of the chucking disk 33 protruded from the central hole of the ring piece 38 with an elastic pre-stress to strengthen the clamping of the optical disc 41 by the chucking disk 33.

Figure 8:
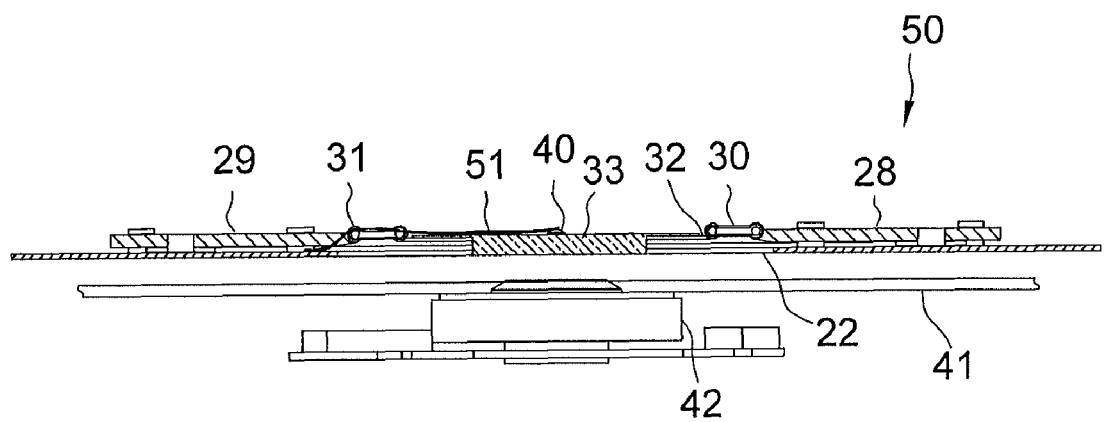
FIG. 8 shows a 3D diagram of an optical disc clamping device being in a release state according to a second embodiment of the invention.

As indicated in FIG. 8, a 3D diagram of an optical disc clamping device 50 being in a release state according to a second embodiment of the invention is shown. When the optical disc clamping device 50 releases the optical disc 41, the driving bar 25 (referring to FIG. 6) is driven to move towards the center hole 22 to synchronously drive the first slider 28 and the second slider 29 as well as the first pivotal rod 30 and the second pivotal rod 31 to move away from the center hole 22. Despite the second pivotal rod 31 touching and pushing the suppresser 51, the suppresser 51 being elastic is raised and makes room for the second pivotal rod 31 to move. Thus, the first pivotal rod 30 and the second pivotal rod 31 can synchronously push the carrier 32 upwards from its both ends. Meanwhile, the raised chucking disk 33 resists the elastic force of the suppresser 51 with the dome 40, and makes the suppresser 51 deformed for allowing the chucking disk 33 to be raised to the center hole 22 and set free from the magnetic attraction of the spindle motor 42 disposed underneath so as to release the optical disc 41.

With the structure of driving the carrier to rise or sink provided by the optical disc clamping device of the first embodiment, the optical disc clamping device of the second embodiment of the invention can suppress the clamping round plate with an elasticity enhanced suppresser to tightly clamp the optical disc and avoid the optical disc coming off due to vibration. Also, when the optical disc drive is not horizontally installed, the carrier 32 still can move towards the spindle motor.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An optical disc clamping device disposed on a base plate of an optical disc drive, wherein the base plate has a center hole disposed above a spindle motor, a first slide recess and a second slide recess are disposed on two opposite ends of the center hole, the base plate further has a slide channel whose sliding direction is perpendicular to the two slide recesses, and the optical disc clamping device comprises:
  a driving bar disposed to slide in the slide channel;
  a first slider disposed in the first slide recess, wherein the first slider slides in the first slide recess, and one end of the first slider near the center hole is pivotally connected to the first pivotal rod;
  a second slider disposed in the second slide recess, wherein the second slider slides in the second slide recess, and one end of the second slider near the center hole is pivotally connected to the second pivotal rod;
  a first linking bar, wherein one end of the first linking bar is pivotally connected to one side of the driving bar and the other end of the first linking bar is extended to the first slide recess and pivotally connected to the first slider;
  a second linking bar, wherein one end of the second linking bar is pivotally connected to the other side of the driving bar opposite to the first linking bar, and the other end of the second linking bar is extended to the second slide recess and pivotally connected to the second slider;
  a carrier disposed in the center hole, wherein the carrier has a round hole, and the two ends of the carrier are respectively pivotally connected to the first pivotal rod and the second pivotal rod;
  a chucking disk disposed on the round hole of the carrier;
  wherein, when the driving bar is moved towards the center hole, the first linking bar and the second linking bar are synchronously driven for enabling the first slider and the second slider to respectively move the first pivotal rod and the second pivotal rod away from the center hole for driving the carrier to carry the chucking disk to be moved from the spindle motor, and when the driving bar is moved away from the center hole, the first linking bar and the second linking bar are synchronously driven for enabling the first slider and the second slider to respectively drive the first pivotal rod and the second pivotal rod towards the center hole for driving the carrier to carry the chucking disk to contact the spindle motor.

2. The optical disc clamping device according to claim 1, wherein the slide channel is formed by a pair of guide pins protruded from the base plate, each of the two ends of the driving bar has a hole, and the pair of guide pins passes through the two holes and guides the driving bar to slide.

3. The optical disc clamping device according to claim 1, wherein two pairs of opposite U-shaped indentation are respectively formed to lateral sides of the first slide recess and the second slide recess of the base plate by way of stamping for limiting the sliding direction from two sides of the first slider and the second slider.

4. The optical disc clamping device according to claim 1, wherein two ends of both the first pivotal rod and the second pivotal rod have two pivotal spindles.

5. The optical disc clamping device according to claim 1, wherein the chucking disk comprises a ring piece and a body, aperture of the ring piece is larger than the round hole, the body is in a shape of a round plate with a magnet disposed therein and is disposed under the center of the ring piece, aperture of the body is slightly smaller than the round hole so that the body is disposed in the round hole, and the ring piece is engaged at the rim of the round hole.

6. The optical disc clamping device according to claim 5, wherein the ring piece has a central hole and there is a dome protruded from the ring piece.

7. The optical disc clamping device according to claim 6, wherein a suppresser is fixed at the rim of the central hole, and one end of the suppresser presses on the dome.

8. The optical disc clamping device according to claim 7, wherein the suppresser is disposed in the rim of the second slide recess near the center hole, and a U-shaped wall is formed at one end of the second slider near the center hole to fix the suppresser.

9. The optical disc clamping device according to claim 7, wherein the suppresser crosses over the second pivotal rod and presses on the dome with an elastic pre-stress.

10. The optical disc clamping device according to claim 1, wherein the base plate is a cover of the optical disc drive.

* * * * *